United States Patent [19]
Lenk et al.

[11] Patent Number: 6,104,170
[45] Date of Patent: Aug. 15, 2000

[54] METHOD AND CIRCUIT FOR PREVENTING OSCILLATIONS IN A BATTERY CHARGER

[75] Inventors: Ronald J. Lenk, Sunnyvale; Steven W. Bryson, Cupertino, both of Calif.

[73] Assignee: Fairchild Semiconductor Corporation, South Portland, Me.

[21] Appl. No.: 09/301,155

[22] Filed: Apr. 28, 1999

Related U.S. Application Data

[60] Provisional application No. 60/113,642, Dec. 23, 1998.

[51] Int. Cl.[7] ......................................................... H02J 7/06
[52] U.S. Cl. ............................................. 320/163; 327/375
[58] Field of Search .................................... 320/107, 134, 320/463; 327/312, 375, 323

[56] References Cited

U.S. PATENT DOCUMENTS

| | | | |
|---|---|---|---|
| 4,131,841 | 12/1978 | Bennefeld | 320/121 |
| 4,897,591 | 1/1990 | Spani | 320/164 |
| 5,325,039 | 6/1994 | Ninomiya | 320/157 |
| 5,382,893 | 1/1995 | Dehnel | 320/160 |
| 5,442,274 | 8/1995 | Tamai | 320/146 |
| 5,469,043 | 11/1995 | Cherng et al. | 320/161 |
| 5,497,403 | 3/1996 | Harada et al. | 327/312 |
| 5,663,671 | 9/1997 | Steglich | 327/323 |
| 5,698,964 | 12/1997 | Kates et al. | 320/125 |
| 5,723,970 | 3/1998 | Bell | 320/140 |
| 5,844,440 | 12/1998 | Lenk et al. | 327/322 |
| 5,986,437 | 11/1999 | Lee | 320/162 |

FOREIGN PATENT DOCUMENTS

| | | | |
|---|---|---|---|
| 002516899 | 10/1975 | Germany | 327/312 |
| 360096915 | 10/1975 | Japan | 327/323 |

*Primary Examiner*—Peter S. Wong
*Assistant Examiner*—Pia Tibbits
*Attorney, Agent, or Firm*—Townsend and Townsend and Crew LLP

[57] ABSTRACT

Method and circuitry for clamping outputs of inactive error amplifiers in battery chargers eliminate delays and prevent oscillatory tendencies. By clamping the output of, for example, an inactive current loop amplifier in response to the output of an active voltage loop amplifier in a battery charging circuit, the inactive amplifier is prevented from saturating, such that it can take over as the controlling loop with minimal delay.

19 Claims, 5 Drawing Sheets

METHOD AND CIRCUIT FOR PREVENTING OSCILLATIONS IN A BATTERY CHARGER

CROSS-REFERENCE TO RELATED APPLICATION

This application claims priority from provisional application serial No. 60/113642, filed Dec. 23, 1998, the disclosure of which is incorporated herein by reference.

BACKGROUND OF THE INVENTION

The present invention relates in general to battery charger oil circuitry, and in particular to improved method and circuitry for controlling battery chargers that reduce circuit complexity and prevent undesirable oscillations.

A typical method of charging a battery for a portable consumer application involves providing a constant charging current into the battery until the battery reaches a certain voltage. The voltage is then regulated with a voltage control loop at a constant level causing the current to gradually reduce over time. This is usually accomplished by controlling battery charger circuitry with a combination of a current feedback amplifier and a voltage feedback amplifier as shown in FIG. 1A. To recharge the battery in the shortest possible time, it is common to use the maximum available current for charging. As the battery approaches the point at which a switch to voltage regulation is to occur, however, an unwanted side-effect may occur. The battery typically has a built-in over-voltage protection switch 100. Since the battery has a non-zero impedance, the high charging current makes the terminal voltage appear higher than it would be if the battery were open circuit. This may cause the over-voltage protection switch to open (FIG. 1B). When this happens, the voltage rises rapidly as the large charging current flows into the open circuit. This causes the voltage control loop to take over, greatly reducing the charging current (FIG. 1C). With reduced charge current, the battery terminal voltage reduces, causing the over-voltage protection switch to close (FIG. 1D). By this point, however, there is very little current flowing into the battery and the voltage begins to drop. Because of the dropping voltage level, the current loop takes over (FIG. 1E). Depending on the large-signal bandwidth of the current control loop, the charge current to the battery may greatly overshoot. This is because the current loop amplifier saturates at its rail voltage when it is not in control and requires time both to desaturate and to slew to its appropriate output level. Whether there is overshoot or not, this cycle may repeat continually resulting effectively in an oscillating system.

One solution to this problem has been the use of the so-called soft-start of the system controller. When an over-voltage condition is detected, the soft-start is reset. Thus, when the current loop comes back into control, even though it is demanding a very high current, the soft-start prevents this by limiting the duty cycle; and the duty cycle is allowed to increase only slowly, so that the current increases slowly. This avoids the current overshoot, and can also be made to avoid oscillations.

A drawback of this approach is that it severely limits the actual, large-signal bandwidth at the current control loop. Additionally, since it introduces a non-linear element in a linear system, it may be capable of causing its own oscillations under certain circumstances. Finally, combining two functions into one (soft-start and oscillation suppression) renders the circuitry more complex, may create difficulties in component selection, and can be confusing for a designer.

SUMMARY OF THE INVENTION

The present invention uses two or more error amplifiers combined in a novel circuit architecture that generates battery charger control signal without the above drawbacks. Broadly, according to the present invention, by clamping the outputs of the error amplifiers, the circuit eliminates the condition in which an error amplifier saturates and thus eliminates a potential source of current overshoot. In a preferred embodiment, error amplifier outputs are cross-clamped to ensure that the output of the amplifiers are clamped at the same or slightly above the signal at the output of the active error amplifier. The inactive error amplifiers are thus prevented from saturating and the change-over from one error loop to another takes place with minimal delay.

Accordingly, in one embodiment, the present invention provides a battery charging circuit including a charge delivery circuit coupled to the battery; a voltage loop amplifier having an input coupled to receive a signal indicating battery voltage, and an output coupled to the charge delivery circuit; a current loop amplifier having an input coupled to receive a signal indicating battery current, and an output coupled to the charge delivery circuit; and a clamping circuit coupling the output of the voltage loop amplifier to the output of the current loop amplifier, wherein the clamping circuit operates to prevent the current loop amplifier from saturating. In an alternate embodiment, the clamping circuit is configured to provide for cross-clamping between the current loop amplifier output and the voltage loop amplifier output.

In another embodiment, the present invention provides a method of charging a battery including the steps of: detecting a battery voltage by a voltage loop amplifier; detecting a battery current by a current loop amplifier, controlling an amount of current being supplied to the battery in response to the voltage loop amplifier output or the current loop amplifier output; and clamping the output of the current loop amplifier with the output of the voltage loop amplifier to prevent current loop amplifier from saturating.

A better understanding of the nature and advantages of the improved method and circuitry for charging a battery can be gained with reference to the detailed description below and the accompanying drawings.

DESCRIPTION OF THE SPECIFIC EMBODIMENTS

Figure 1A:
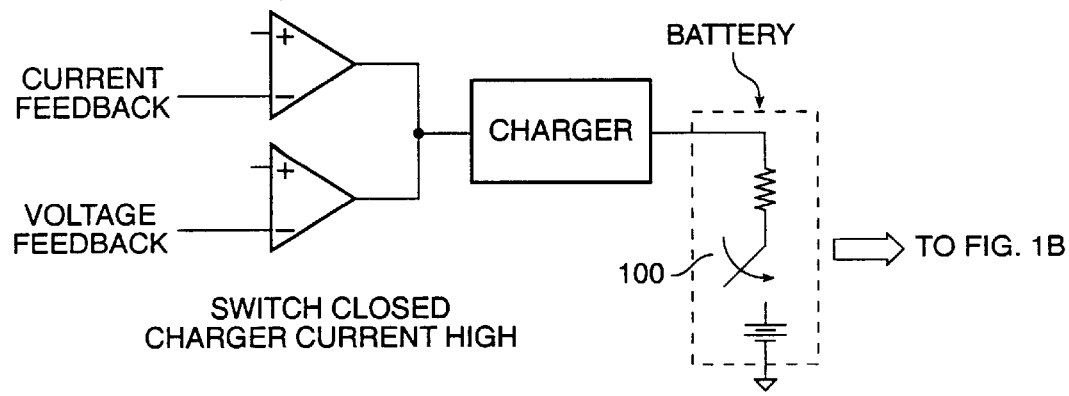
FIGS. 1A, 1B, 1C, 1D, and 1E depict a battery charging circuit in its various modes of operation illustrating potential oscillation problems.
Figure 1B:
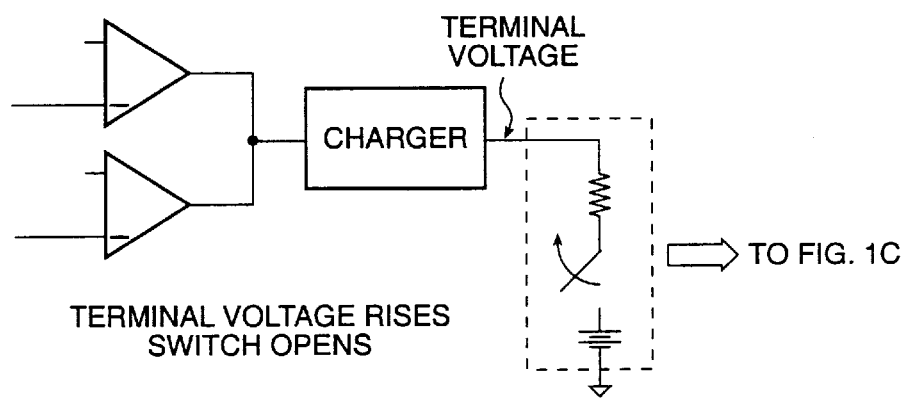
Figure 1C:
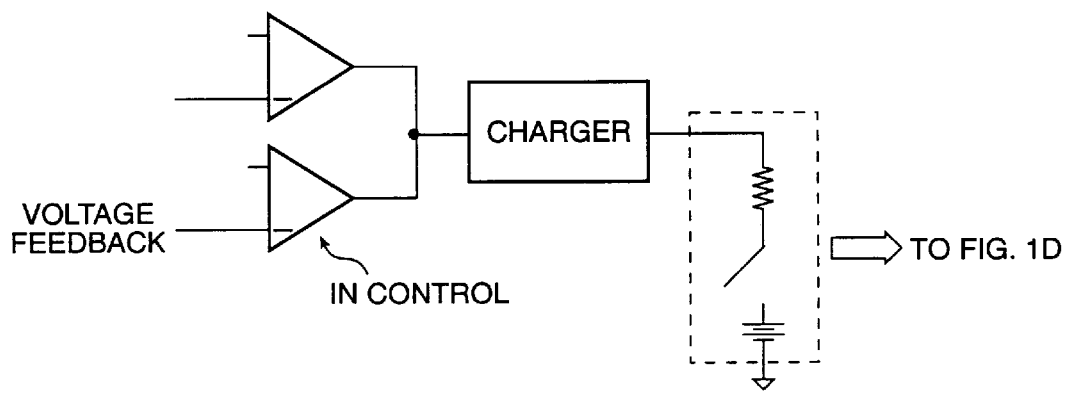
Figure 1D:
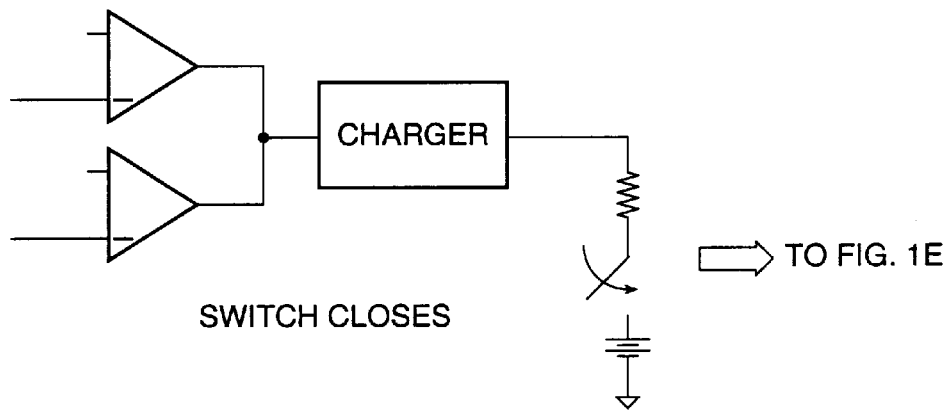
Figure 1E:
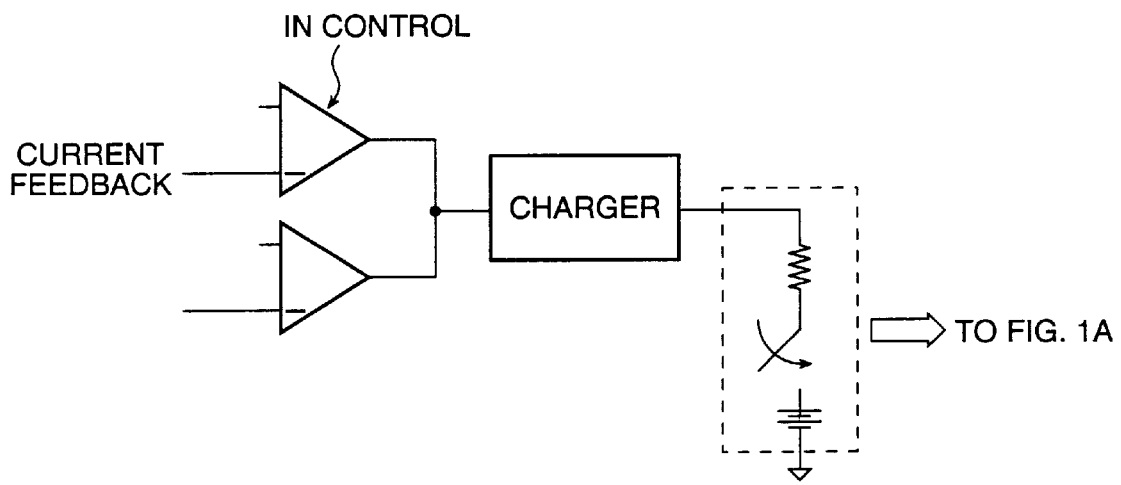
Figure 2A:
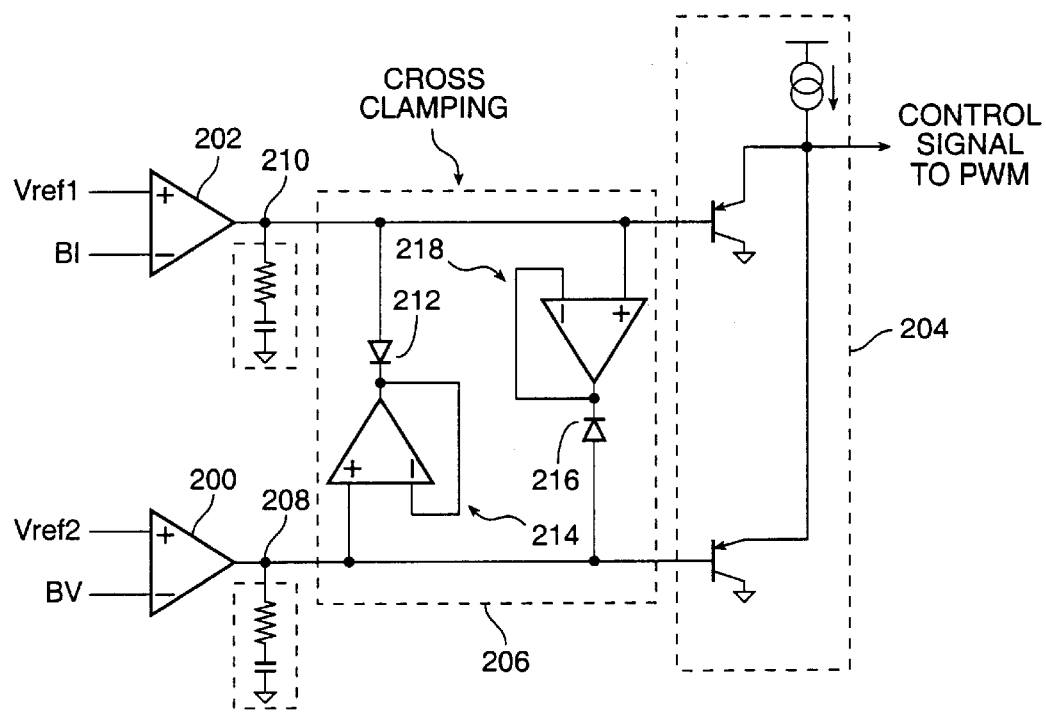
FIGS. 2A and 2B show alternative embodiments for a simplified and exemplary battery charging circuit according to the present invention.

Referring to FIG. 2A, there is shown a simplified circuit diagram for the improved battery charging circuit according to an exemplary embodiment of the present invention. In the example shown in FIG. 2, the battery charging circuit includes a voltage error amplifier 200 that receives battery voltage signal BV at an input and a reference signal Vref2 at another input, and a current error amplifier 202 that receives a battery current signal BI at one input and a reference signal Vref1 at another. The outputs of error amplifiers 200 and 202 are logically combined together by circuit 204. Combine circuit 204 performs a logical OR function on the error amplifier output signals and generates an output signal for the charge delivery circuit that may use, for example, pulse width modulation (PWM), hysteretic control, or other known battery charging techniques. Voltage error amplifier 200 and current error amplifier 202 are part of the battery charging circuit voltage loop and current loop, respectively. The circuit may include more error amplifiers, such as a power error amplifier, that participate in the battery charging function. A more complete diagram for the battery charger circuitry showing the various error loops is disclosed, and its operation described in greater detail, in commonly-assigned U.S. patent application Ser. No. 09/352,437, entitled "Power Measurement For Adaptive Battery Charger," by S. Bryson, which is hereby incorporated by reference in its entirety.

Referring back to FIG. 2A, the circuit further includes a cross-clamping circuit 206 that couples between the outputs of the two error amplifiers 200 and 202. The function of circuit 206 is to cross-clamp the outputs of the two error amplifiers. In a specific embodiment, the present invention takes the output of the active error amplifier and uses it to clamp the other one amplifier at a slightly higher voltage. The exemplary block diagram level embodiment for cross-clamping circuit 206 shown in FIG. 2A includes a diode 212 that connects the output of amplifier 202 (node 210) to the output of amplifier 200 (node 208) via a unity-gain buffer amplifier 214. The output of amplifier 200 (node 208) is similarly connected to the output of amplifier 202 (node 210) via a diode 216 and unity-gain buffer amplifier 218.

Accordingly, in this embodiment, the output of the inactive amplifier is set to one diode drop above that of the active amplifier. With the output of the inactive amplifier maintained at this level, the compensation components of the amplifier are pre-charged to their correct value to keep the amplifier out of saturation. This allows the inactive amplifier to begin controlling immediately when there is a change-over in the controlling loop. Thus, the present invention eliminates time delays between loops and does not require the use of soft-start. The system is linear with respect to the error amplifiers, and therefore does not have a tendency to oscillate. Furthermore, the various functions of the charger circuitry are kept separate reducing the complexity of the design.

Figure 2B:
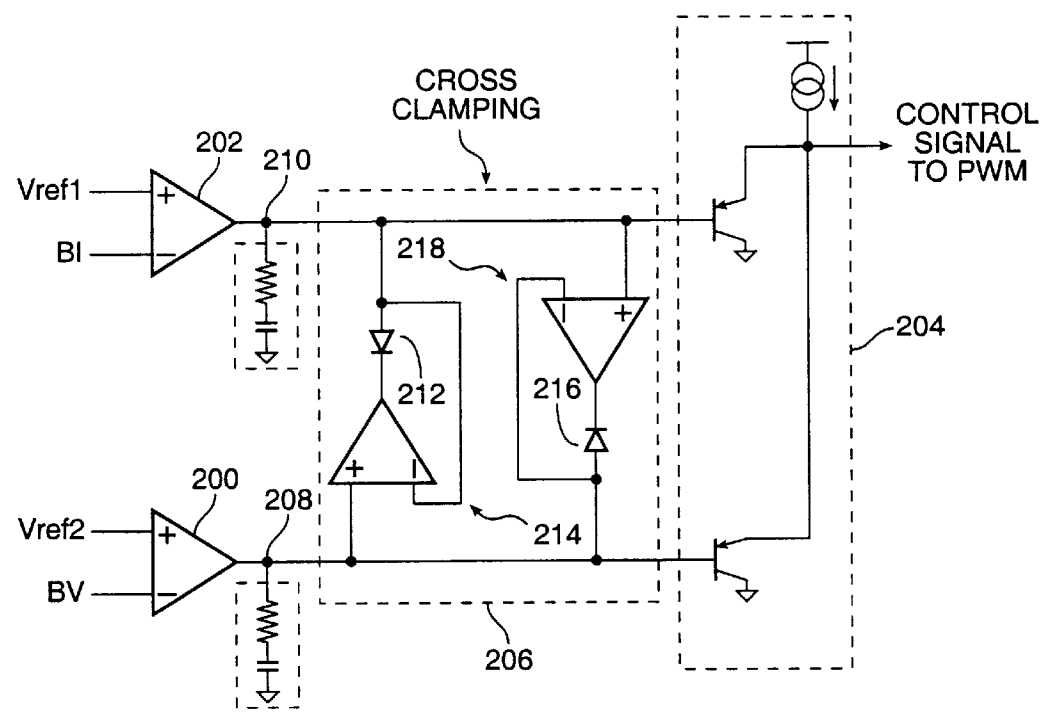

It is to be understood that while the embodiment shown in FIG. 2A cross-clamps both outputs, to eliminate the oscillatory tendency of the circuit described above, it is only necessary to clamp the current loop amplifier by the output of the voltage loop amplifier. That is, an alternative embodiment of this invention may include only diode 212 and buffer 214. Furthermore, in the exemplary embodiment shown in FIG. 2A, the higher voltage is set at one diode drop higher, but the output of the inactive amplifier could be clamped to the same value, or any other value greater than, the output of the active amplifier. FIG. 2B, for example, illustrates a variation in which diodes 212 and 216 are connected inside the feedback loops of amplifiers 214 and 218, respectively. In this embodiment, the output of the inactive amplifier is clamped to the same value as the output of the active amplifier.

Figure 3:
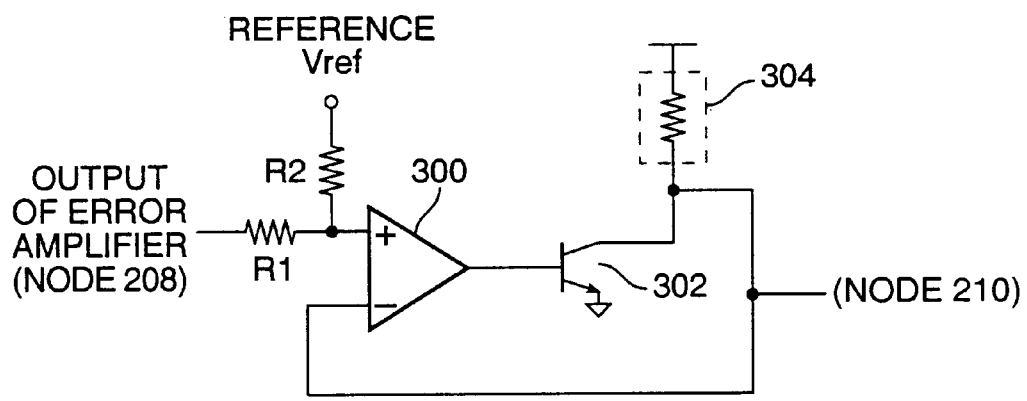
FIG. 3 is a simplified circuit schematic for an alternate embodiment of the battery charging circuit according to an exemplary embodiment of the present invention.

An alternative embodiment for the present invention that provides for more flexibility in terms of the clamping level is shown in FIG. 3. Instead of forcing the inactive amplifiers to be no more than a diode drop higher than the active amplifier, in this embodiment, the voltage is set by adding a reference voltage to the output that can be adjusted as desired. The simplified circuit of FIG. 3 shows an amplifier 300 that receives the output of an error amplifier (e.g., node 208 in FIG. 2) via a resistor R1. A reference voltage Vref connects to the same input of amplifier 300 via another resistor R2. A bipolar transistor 302 connects in a feedback loop around amplifier 300 as shown. The collector of transistor 302 is resistively pulled-up 304 and provides the output of the clamp circuit connecting to the output of another error amplifier (e.g., node 210 in FIG. 2). In this circuit configuration, bipolar transistor 302 acts essentially as an ideal diode that can only sink, not source, current but with zero forward bias voltage drop. The reference voltage introduces an offset value to the clamp circuit output. The difference in voltage between the output of the active amplifier (at node 208) and the others is thus set by either adjusting the reference voltage level or the value of the resistors.

Figure 4:
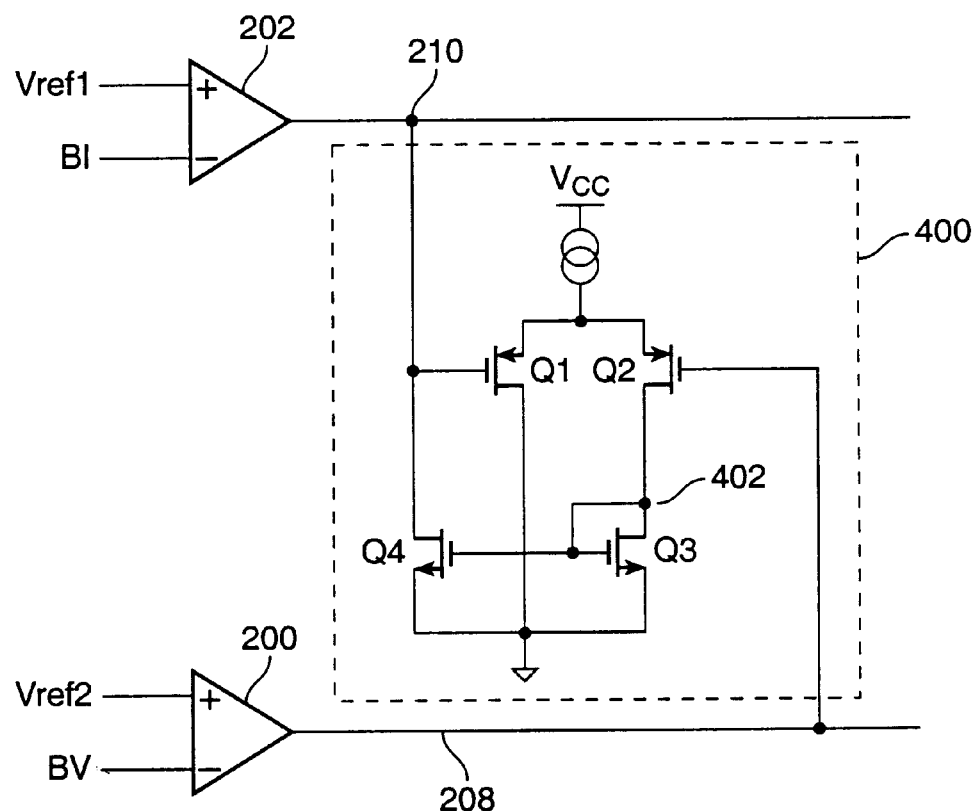
FIG. 4 is a more detailed circuit schematic for an exemplary implementation of the battery charging circuit of the present invention.

FIG. 4 shows an exemplary circuit implementation for a clamping circuit for use in the battery charger circuit of the present invention. Clamping circuit 400 operates to clamp current error amplifier 202 output based on voltage error amplifier 200 output. The circuit includes a pair of transistors Q1 and Q2 that receive the amplifier output nodes 210 and 208 at their gate terminals, respectively. Transistors Q1 and Q2 sense the difference between the output voltages at nodes 210 and 208, operating essentially as a comparator. When the current loop output voltage at node 210 tries to go higher than the voltage loop output voltage at node 208, p-channel transistor Q2 is turned on causing a current to flow through transistor Q3. The current flowing through transistor Q3 is mirrored over to transistor Q4 causing more current to be pulled out of the output of amplifier 202, and thus pulling the current loop output voltage back down. Accordingly, this circuit operates to clamp the current loop amplifier output node 210 at the same level as the voltage at node 208.

Figure 5:
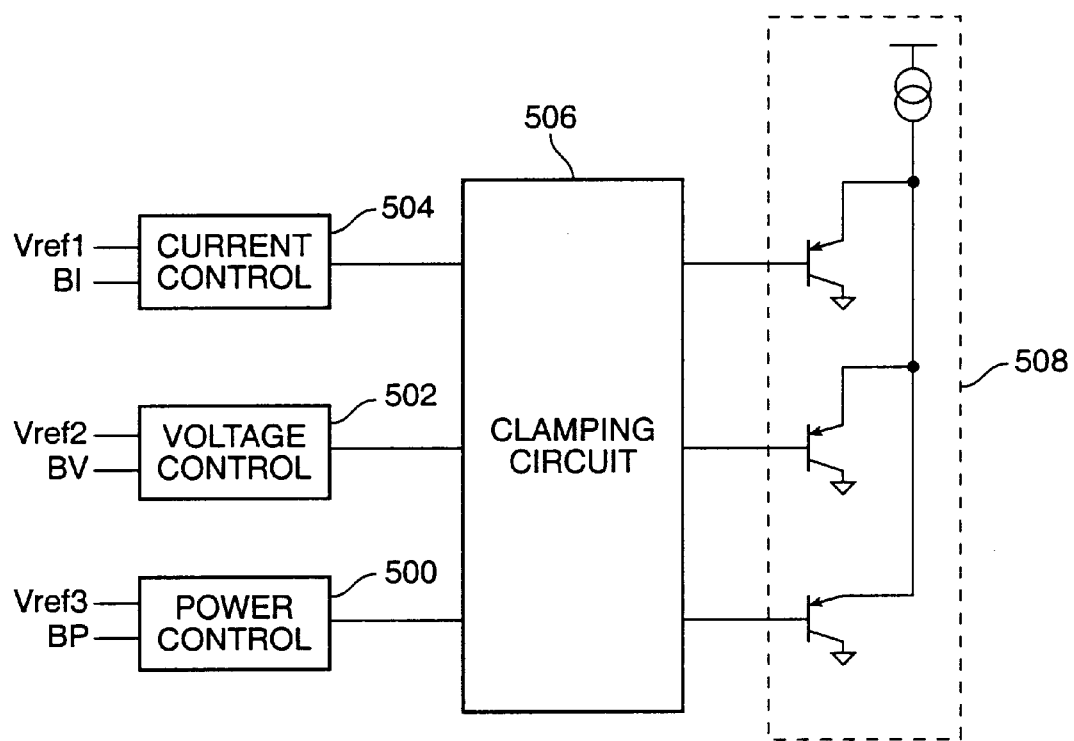
FIG. 5 is a block level diagram depicting a battery charging circuit according to one embodiment of the present invention that includes a power control loop in addition to the current and voltage loops.

FIG. 5 is a simplified block diagram of another embodiment of the present invention wherein the battery charger circuitry includes a power control loop 500 in addition to the current and voltage control loops 502 and 504. A preferred embodiment for implementing power loop 500 is described in detail in the above-referenced, commonly-assigned patent application Ser. No. 09/352,437, to Bryson. With three error amplifiers, different permutations of cross-clamping or independent clamping of the amplifier outputs can be implemented depending on the application requirements.

In conclusion, the present invention provides method and circuitry for eliminating oscillatory conditions in battery charger circuits by clamping outputs of loop amplifiers. According to the present invention the cross-clamping of loop amplifier outputs ensures that loop amplifiers do not saturate such that when the loop takes over the amplifier takes control without delay. While the above is a complete description of specific embodiments of the present invention, it is possible to use various alternatives, modifications and equivalents. For example, the clamping may be accomplished by a number of different types of circuit techniques some of which are described herein for illustrative purposes. Also, the circuit may include more than two error amplifiers that are cross-clamped selectively. Therefore, the scope of the present invention should be determined not with reference to the above description but should, instead, be determined with reference to the appended claims, along with their full scope of equivalents.

What is claimed is:

1. A battery charging circuit comprising:
   a charge delivery circuit configured to drive a battery;
   a voltage loop amplifier having an input coupled to receive a signal indicating battery voltage, and an output coupled to the charge delivery circuit;
   a current loop amplifier having an input coupled to receive a signal indicating battery current, and an output coupled to the charge delivery circuit; and
   a clamping circuit coupled to the output of the voltage loop amplifier and to the output of the current loop amplifier,
   wherein, the clamping circuit operates to prevent the inactive one of the voltage loop amplifier or the current loop amplifier from saturating.

2. The battery charging circuit of claim 1 wherein the clamping circuit comprises circuitry to clamp the output of the current loop amplifier to a level substantially equal to that of the voltage loop amplifier, when the voltage loop amplifier is active and current loop amplifier inactive.

3. The battery charging circuit of claim 2, wherein the clamping circuit comprises:
   an amplifier circuit having a first input coupled to the output of the voltage loop amplifier, a second input coupled to the output of the current loop amplifier, and an output; and
   a clamp transistor coupled between the output of the amplifier circuit and the output of the current loop amplifier.

4. The battery charging circuit of claim 3 wherein the amplifier circuit comprises a pair of field effect transistors having commonly-coupled source terminals and gate terminals that respectively couple to the outputs of the voltage loop amplifier and the current loop amplifier, and
   wherein the clamp transistor is a field effect transistor having a gate terminal coupled to the output of the amplifier circuit, a first current-carrying terminal coupled to the output of the current loop amplifier, and a second current-carrying terminal coupled to ground.

5. The battery charging circuit of claim 1 wherein the clamping circuit comprises circuitry to clamp the output of the current loop amplifier to a predetermined level greater than that of the voltage loop amplifier, when the voltage loop amplifier is active and current loop amplifier inactive.

6. The battery charging circuit of claim 5 wherein the clamping circuit comprises:
   a diode having a first terminal coupled to the output of the voltage loop amplifier and a second terminal; and
   a buffer having an input terminal coupled to the output of the current loop amplifier and an output terminal coupled to the second terminal of the diode.

7. The battery charging circuit of claim 6 wherein the first terminal of the diode comprises a cathode and the second terminal comprises an anode, and
   wherein, the buffer comprises a unity-gain coupled amplifier.

8. The battery charging circuit of claim 5 wherein the clamping circuit comprises:
   a buffer amplifier having a first input, a second input and an output;
   a first resistive element coupled between the output of the voltage loop amplifier and the first input of the buffer amplifier;
   a second resistive element coupled between a source voltage and the first input of the buffer amplifier; and
   a transistor coupled between the output of the buffer amplifier and the second input of the buffer amplifier.

9. The battery charging circuit of claim 1 wherein the clamping circuit is further configured to provide for cross-clamping between the current loop amplifier output and the voltage loop amplifier output.

10. The battery charging circuit of claim 9 wherein the clamping circuit comprises:
    a voltage loop clamp circuit coupled between the output of the current loop amplifier and the output of the voltage loop amplifier, and configured to clamp the output of an inactive voltage loop amplifier to a predetermined level in response to the output of an active current loop amplifier; and
    a current loop clamp circuit coupled between the output of the voltage loop amplifier and the output of the current loop amplifier, and configured to clamp the output of an inactive current loop amplifier to a predetermined level in response to the output of an active voltage loop amplifier.

11. The battery charging circuit of claim 10 wherein each of the voltage loop and the current loop clamp circuits comprises a diode coupling one output to another via a buffer.

12. The battery charging circuit of claim 10 wherein each of the voltage loop and the current loop clamp circuits comprises an amplifier that receives the amplifier output signals at its inputs and drives a control terminal of a clamp transistor.

13. The battery charging circuit of claim 1 further comprising a power loop amplifier having an input coupled to receive a signal indicating battery power level, and an output coupled to the clamping circuit, and
    wherein, the clamping circuit operates to prevent the power loop amplifier from saturating when the power loop is inactive.

14. A method of charging a battery comprising the steps of:
    detecting a battery voltage by a voltage loop amplifier;
    detecting a battery current by a current loop amplifier;
    controlling an amount of charge being supplied to the battery in response to the voltage loop amplifier output or the current loop amplifier output; and
    clamping the output of an inactive one of the voltage loop amplifier and the current loop amplifier to prevent the inactive loop amplifier from saturating.

15. The method of charging a battery as set forth in claim 14 wherein the step of clamping clamps the output of the current loop amplifier to a voltage that is substantially equal to one diode drop above the output of the voltage loop amplifier.

16. The method of charging a battery as set forth in claim 14 wherein the step of clamping clamps the output of the current loop amplifier to a voltage that is substantially equal to the output of the voltage loop amplifier.

17. The method of charging a battery as set forth in claim 14 wherein the step of clamping comprises the steps of:
    comparing the output of the voltage loop amplifier to the output of the current loop amplifier; and
    controlling a clamp transistor in response to the step of comparing.

18. The method of charging a battery as set forth in claim 14 further comprising a step of clamping the output of the voltage loop amplifier with the output of the current loop amplifier to prevent voltage loop amplifier from saturating when inactive.

19. The method of charging a battery as set forth in claim 14 further comprising a step of detecting a battery power level by a power loop amplifier, and wherein the step of clamping further clamps an output of the power loop amplifier when the power loop is inactive to prevent the power loop amplifier from saturating.

* * * * *